Patented Nov. 18, 1952

2,618,582

UNITED STATES PATENT OFFICE 2,618,582

PEST CONTROL

John P. Buckmann, Redondo Beach, Calif., assignor to Union Oil Company of California, Los Angeles, Calif., a corporation of California No Drawing. Application November 1, 1948, Serial No. 57,832

3 Claims. (Cl. 167—30)

This invention relates to pest control, and in particular concerns improved methods and compositions for arresting or preventing the growth of insects and other organisms which are economically and physiologically undesirable. More particularly, it relates to pest control methods and compositions involving the use of certain aromatic sulfur compounds as toxic agents. The term "pest control" is employed herein as a generic expression including such terms as insecticide, fungicide, aphicide, larvicide, vermicide, pesticide, and the like.

The aromatic sulfur compounds which are employed as active agents in the control of pests in accordance with the invention are compounds in which two aryl radicals are joined by a linkage involving two atoms each of sulfur and oxygen, and are alternatively referred to as diaryl disulfoxides or aryl esters of aryl thiolsulfonic acids having the respective formulas:

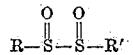

Diaryl disulfoxide or

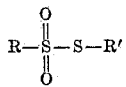

Aryl ester of aryl thiolsulfonic acid wherein R and R' each represents an aryl radical. Inasmuch as the preponderance of evidence appears to indicate that the compounds in question usually have the disulfoxide type of structure, particularly when both aryl radicals are the same (cf. Gilman, "Organic Chemistry," 2nd ed., pp. 912, 913), they are herein referred to as diaryl disulfoxides even though in some instances they may actually have the alternative structure or resinate between the two types of structure. The invention is not limited by theoretical considerations concerning the exact molecular arrangement of these compounds.

The diaryl disulfoxide toxic agents of the present invention may be obtained in a number of ways. Those in which the two aryl groups are the same are conveniently prepared by heating the corresponding aryl sulfinic acids in the presence of an aqueous mineral acid whereby a disproportionation reaction takes place according to the equation:

Unsymmetrical diaryl disulfoxides, i. e., those in which the two aryl groups are different, as well as those of symmetrical structure, may be prepared by reaction between an aryl sulfenyl halide and the silver salt of an aryl sulfinic acid:

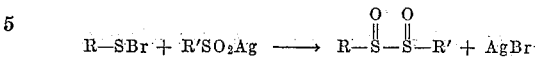

These compounds may also be obtained by oxidation of the corresponding diaryl disulfides. Other methods of preparation are described by Gilman, "Organic Chemistry," 2nd ed., pp. 906–908, (1943).

The following examples will illustrate the preparation of several diaryl disulfoxide compounds, but are not to be construed as limiting the invention. All proportions are given in parts by weight.

Example I

Sodium benzene sulfinate was prepared by reducing benzene sulfonyl chloride with alkaline sodium sulfite. The reaction was carried out by gradually adding 623 parts of benzene sulfonyl chloride to 720 parts of sodium sulfite dissolved in 3000 parts of water over a period of 2 hours with constant stirring. During the addition of the benzene sulfonyl chloride, 50 per cent aqueous sodium hydroxide was added from time to time to maintain the pH between about 8 and 11. The temperature rose from an initial value of 65° C. to about 90° C. and was maintained at the latter value by regulation of the addition rate. When all of the benzene sulfonyl chloride had been added, the mixture was heated with stirring at 80°–90° C. for 1.5 hours. The sodium benzene sulfinate formed by the reaction appeared as a heavy white precipitate suspended in a light brown mother liquor. The mixture was then made strongly acid by gradually adding concentrated sulfuric acid whereby free benzene sulfinic acid separated from the aqueous phase as an orange-colored oil. This mixture was heated with stirring at reflux temperature for 5.5 hours to effect the disproportionation reaction described above, after which the water layer was drawn off and the organic layer was washed with aqueous sodium carbonate and water and was dried by blowing with air on a steam bath. Upon chilling, the resulting liquid product solidified to a white crystalline solid which was then recrystallized from petroleum ether solution to obtain the diphenyl disulfoxide in the form of shiny white prisms having a melting point of 45° C.

Example II

Sodium p-chlorobenzene sulfinate was prepared by reducing p-chlorobenzene sulfonyl chloride with aqueous sodium sulfide employing the procedure described above in Example I. This product was acidified with hydrochloric acid to form free p-chlorobenzene sulfinic acid and the mixture was heated at reflux temperature to effect the disproportionation reaction. After separation from the aqueous phase, the product was washed and dried and was crystallized once from toluene solution and once from isopropanol, whereby pure di-(p-chlorophenyl) disulfoxide was obtained in the form of large colorless prisms melting at 136° C.

For reasons of economy and ease of preparation it is preferred to employ symmetrical diaryl disulfoxides in practice of the present invention. As further examples of such compounds there may be mentioned di-(o-tolyl) disulfoxide, di-(o-bromophenyl) disulfoxide, di - (2,4 - dichlorophenyl) disulfoxide, di-(p-tert.butylphenyl) disulfoxide, di-(p-nitrophenyl) disulfoxide, di-naphthyl disulfoxide, di-(p-octylphenyl) disulfoxide, di-(2,4-di-tert.amylphenyl) disulfoxide, di-(o-xenyl) disulfoxide, di-(o-cyclohexylphenyl) disulfoxide, di-(o-methoxyphenyl) disulfoxide, etc. If desired, however, unsymmetrical diaryl disulfoxides may be employed, examples of such compounds being phenyl p-tolyl disulfoxide, o-chlorophenyl o-tolyl disulfoxide, phenyl naphthyl disulfoxide, p-tert.butylphenyl 2,4-dichlorophenyl disulfoxide, o-bromophenyl p-octylphenyl disulfoxide, phenyl o-methoxyphenyl disulfoxide, phenyl o-xenyl disulfoxide, phenyl 2,4,6-trimethyl-phenyl disulfoxide, etc.

The diaryl disulfoxides described above may be employed in various ways in the control of pest organisms. Most of such compounds are crystalline solids and are hence well suited for outdoor use in orchard or garden spray or dusting compositions since they do not readily evaporate. Spray compositions may take the form of a simple solution of the toxic agent in a non-phytotoxic solvent such as spray oil. More usually, however, such compositions are formulated as aqueous emulsions or suspensions which may contain a wide variety of emulsifying, wetting, or dispersing agents, sticking agents, spreaders, diluents, and secondary toxic agents in addition to the diaryl disulfoxide. Any of the known procedures for preparing such compositions may be employed, and any of the various known wetting agents, spreaders, etc. may be employed in their formulation. In accordance with usual practice, the compositions are conveniently prepared and marketed in dry form as wettable powders or ducts which can be admixed with water at any desired time to form the ultimate spray composition. Such a dry composition may comprise, for example, one or a mixture of the toxic agents of the present class in finely divided form intimately admixed with 0.1 per cent by weight of the sodium salts of mixed sulfated higher alcohols. Upon mixing one part by weight of such composition with 99 parts by weight of water there is obtained an effective suspension-type insecticidal spray of 1 per cent concentration. Such dry compositions may also contain sticking agents, spreaders, and other commonly employed addition agents.

The diaryl disulfoxide toxic agents may also be admixed with active or inert carriers, e. g., talc, starch, aluminum silicate, walnut shell flour, etc., to form insecticidal dusting compositions which may also contain other toxic agents such as sulfur, DDT, pyrethrins, nicotine derivatives, p-dichloro-benzene, etc. Similarly, they may be employed in cattle sprays and the like in conjunction with other toxic agents such as pyrethrins or rotenone, synergists, active or inert solvents, aerosols, etc. They may also be employed alone in soil treatment operations.

The following examples will illustrate the use of the toxic agents of the present class in the control of various pest organisms in various ways, but are not to be construed as limiting the invention:

*Example III*

Diphenyl disulfoxide and di-(p-chlorophenyl) disulfoxide, prepared as described in Examples I and II, respectively, were tested for fungistatic action on *Sclerotina fructicola*. In carrying out the tests, the toxic agent was dispersed in a dilute sugar solution at a concentration twice that desired for the test. The dispersion was then mixed with an equal volume of a nutrient broth culture of the test organism spores. After 24 hours the culture was examined under the microscope and an actual count made to determine the proportion of germinating spores. The results of these tests are tabulated as follows:

| Percentage of Spores Germinating at Concentrations of— | Toxic Agent | |
|---|---|---|
| | Diphenyl Disulfoxide | Di-(p-chlorophenyl) Disulfoxide |
| 0.2 | 0 | 0 |
| 0.1 | 0 | 0 |
| 0.05 | 0 | 0 |
| 0.025 | 0 | 0 |
| 0.0125 | 0 | 0 |
| 0.01 | 1-5 | |
| 0.005 | | 1-5 |
| 0.0025 | 1-5 | 1-5 |
| 0.00125 | 1-5 | 50-100 |
| 0.001 | 10-25 | 50-100 |

*Example IV*

The phytotoxic effect of diphenyl disulfoxide and di-(p-chlorphenyl) disulfoxide with respect to tomato, squash, and chard plants was determined by spraying a healthy young plant of each species with a 1 per cent aqueous suspension of the toxic agent. Seven days after treatment the plants were examined and the following conditions noted:

| Toxic Agent | Plant Condition | | |
|---|---|---|---|
| | Tomato | Squash | Chard |
| Diphenyl disulfoxide. | No injury | Slight injury, no necrosis. | Slight injury, no necrosis. |
| Di - (p - chlorophenyl) disulfoxide. | do | No injury | No injury. |

By means of similar tests it was determined that di-(p-chlorophenyl) disulfoxide had no phytotoxic effect on these plants when applied at concentrations as high as 4 per cent.

*Example V*

A mixture consisting of 0.75 per cent of di-(p-chlorophenyl) disulfoxide and 99.25 per cent of aluminum silicate was milled in a ball mill to obtain a finely-divided dusting composition. This mixture was then dusted at 11-day intervals on squash plants infested with the powdery squash mildew, *Erysiphe cichoracearum*. Over a 44-day observation period it was observed that excellent control of the mildew was obtained with no apparent injury to the plant.

*Example VI*

Diphenyl disulfoxide was mixed with an equal amount of finely-divided talc to form an insecticidal dust. Sections of corn blade which had been thoroughly dusted with this composition were placed in a petri dish containing armyworm larvae (*Cirphus unipuncta*). Twenty-four hours later a larvae count showed a mortality of greater than 90 per cent as compared to a control mortality of less than 10 per cent.

*Example VII*

A suspension of 1 part of diphenyl disulfoxide in 100 parts of water was applied to oranges infested with greenhouse thrips (*Heliothrips haemorrhoidalis*). Three hours later an examination of the oranges showed that a thrip mortality of greater than 90 per cent had been secured by the treatment.

*Example VIII*

One-half pound of diphenyl disulfoxide was ball-milled with an equal amount of dry clay and the mixture was then suspended in 100 gallons of water with the aid of 1 pint of kerosene and about 4 ounces of a spreading agent. The resulting suspension was then applied with a power sprayer to Valencia orange trees which were heavily infested with the citrus red mite (*Paratetranychus citri*). Thirty days after the treatment, 20 leaves were picked from representative parts of each tree and were examined on both sides for living mites. It was found that each leaf bore an average of 1.0 mite as compared with an average of 6.5 mites per leaf on untreated trees. A second examination conducted 77 days after the treatment showed an average mite count of 0.4 mite per leaf. A similar composition containing 1.0 pound of diphenyl disulfoxide per 100 gallons of water and applied to Valencia orange trees in the same manner gave an average 30-day mite count of 0.1 mite per leaf as compared to a control count of 5.7 mites per leaf. A third composition containing 1.0 pound of diphenyl disulfoxide per 100 gallons of water and in which aluminum silicate was employed as the inert diluent showed a 43-day mite count averaging 1.35 mites per leaf.

The concentration in which the toxic agents of the present class are employed in pest control compositions varies widely depending upon a number of factors, including the particular compound employed, the type of composition in which it is used, the type of organism being combatted and the conditions under which the composition is to be used. In general, however, when employed in aqueous emulsion or suspension form as an orchard or garden spray, it is preferable that the composition contain from about 0.1 to about 5.0 per cent by weight of the active agent. Such compositions usually also comprise a small amount, e. g., 0.001 to 0.5 per cent by weight, of a wetting or dispersing agent which serves to secure homogeneous dispersion of the toxic agent in the water and to promote good contact between the spray and the foliage or the like being treated. In other types of compositions, for example in dry dusting compositions wherein the toxic agent is mixed with an inert dry diluent, the active agent is usually employed in somewhat higher proportions, e. g., 5 to 25 per cent or even 50 per cent by weight. For use in soil treatment and the like, it may be desirable to use the active agent at full strength or as a relatively concentrated solution or suspension in a suitable liquid vehicle.

Other modes of applying the principle of my invention may be employed instead of those explained, change being made as regards the methods or materials disclosed provided the steps or compositions stated by any of the following claims, or the equivalent of such stated steps or compositions, be employed.

I, therefore, particularly point out and distinctly claim as my invention:

1. The method of protecting living plants from attack by pest organisms which comprises applying to the surfaces of said plants a toxic amount of a pest control composition containing diphenyl disulfoxide as the essential active ingredient.

2. The method of claim 1 wherein the said pest control composition comprises an aqueous dispersion containing from about 0.1 to about 5 per cent by weight of the said active ingredient.

3. The method of claim 1 wherein the said pest control composition comprises an inert dry carrier material having the said active ingredient absorbed therein.

JOHN P. BUCKMANN.

REFERENCES CITED

The following references are of record in the file of this patent:

UNITED STATES PATENTS

| Number | Name | Date |
| --- | --- | --- |
| 2,148,928 | De Meuron | Feb. 28, 1939 |

OTHER REFERENCES

Beilstein: Volume 6, pages 324 and 330 (1923).

Lauger et al.: Helv. Chim. Acta., volume 27, pages 892 to 908.

Knipling: J. Econ. Ent., volume 34, page 315, April 1941.